United States Patent [19]

Yokota et al.

[11] Patent Number: 4,570,251
[45] Date of Patent: Feb. 11, 1986

[54] OVERLAY RECORDING PREVENTION DEVICE FOR OPTICAL DISC APPARATUS

[75] Inventors: Tsuneshi Yokota, Kawasaki; Akira Nakagawa, Yokohama, both of Japan

[73] Assignee: Tokyo Seibaura Denki Kabushiki Kaisha, Kawasaki, Japan

[21] Appl. No.: 473,630

[22] Filed: Mar. 9, 1983

[30] Foreign Application Priority Data

Mar. 15, 1982 [JP] Japan .................................. 57-40592

[51] Int. Cl.$^4$ .......................................... G11B 21/12
[52] U.S. Cl. ...................... 369/100; 369/54; 369/58; 369/106; 369/116
[58] Field of Search ................. 369/44, 46, 110, 106, 369/116, 100, 54, 58

[56] References Cited

U.S. PATENT DOCUMENTS

| | | | |
|---|---|---|---|
| 4,145,758 | 3/1979 | Drexler et al. | 365/200 |
| 4,308,612 | 12/1981 | Miyauchi et al. | 369/48 |
| 4,363,116 | 12/1982 | Kleuters et al. | 369/44 |
| 4,494,226 | 1/1985 | Hazel et al. | 369/45 |

OTHER PUBLICATIONS

Japanese abstract 55-89920; 8.7, 1980; 8 P 30.

Primary Examiner—Raymond F. Cardillo, Jr.
Assistant Examiner—Steven R. Garland
Attorney, Agent, or Firm—Cushman, Darby & Cushman

[57] ABSTRACT

An overlay recording prevention device for an optical disc apparatus detects a signal corresponding to a recording pit of a recorded track. This signal is detected from a photoelectric signal of an optical head when a tracking error occurs in the recording mode and a beam spot is shifted onto an already-recorded track. A high-level recording laser beam is stopped in response to this detection signal.

6 Claims, 2 Drawing Figures

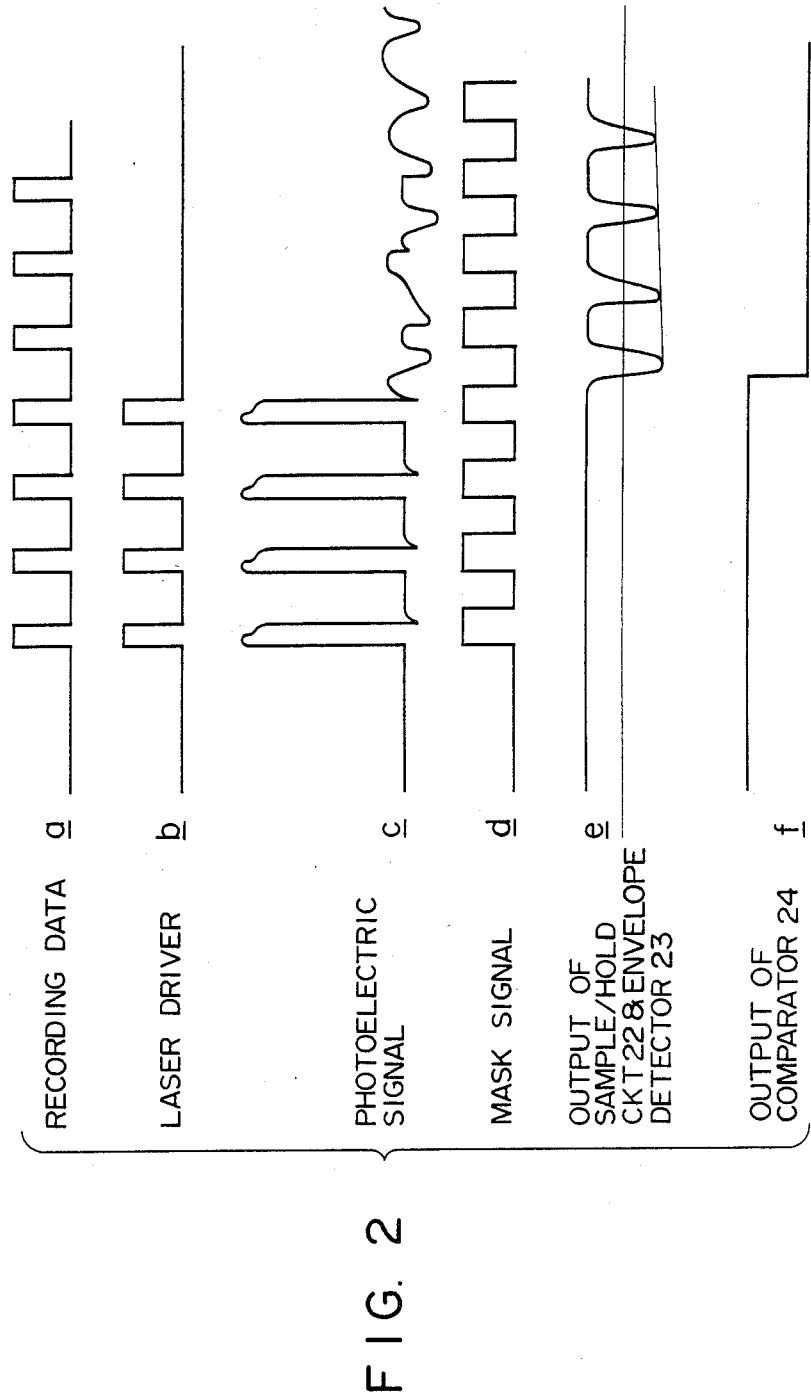

OVERLAY RECORDING PREVENTION DEVICE FOR OPTICAL DISC APPARATUS

BACKGROUND OF THE INVENTION

The present invention relates to an overlay recording prevention device for an optical disc apparatus.

Since optical disc apparatuses can store a great quantity of data at a high recording density and read it out, they have been used in a variety of applications. According to the optical disc apparatus of this type, a pregroove formed in the optical disc is radiated with a low-level reproducing laser beam from an optical head. Reflected light from the optical disc is received by the optical head which then produces as a tracking signal a photoelectric signal corresponding to the reflected light. The optical head is then tracking-controlled in accordance with this tracking signal. The optical head emits a high-level recording laser beam onto the optical disc while the optical head is performing tracking of the pregroove, thereby forming recording pits in the pregroove of the optical disc. In this manner, when the optical disc is alternately radiated with the reproducing and recording laser beams, the optical head performs tracking of the pregroove and at the same time records data on the optical disc along the pregroove thereof.

However, when a strong impact or the like is imposed on the optical disc apparatus while data is being written in the optical disc, a tracking error occurs. This tracking error causes an erroneous shift of the recording laser beam spot onto an already-recorded track, thereby forming another recording pit thereon, resulting in overlay recording. In this case, the previously recorded data on the track is erased, which disables data retrieval and readout. Even if data can be retrieved, the readout data includes many errors.

SUMMARY OF THE INVENTION

It is, therefore, an object of the present invention to provide an overlay recording prevention device for an optical disc apparatus so as to prevent overlay recording due to a tracking error.

In order to achieve the above object of the present invention, there is provided an overlay recording prevention device for an optical disc apparatus comprising detecting means for detecting a recording pit component included in reflected light of a reproducing laser beam generated for tracking while a recording laser beam is generated in the recording mode, and means for interrupting transmission of recording data in response to a detection signal from said detecting means.

BRIEF DESCRIPTION OF THE DRAWINGS

FIG. 2 consisting of parts (a)-(f) is a timing chart for explaining the mode of operation of the overlay recording prevention device shown in FIG. 1.

DETAILED DESCRIPTION OF THE PREFERRED EMBODIMENT

Figure 1:
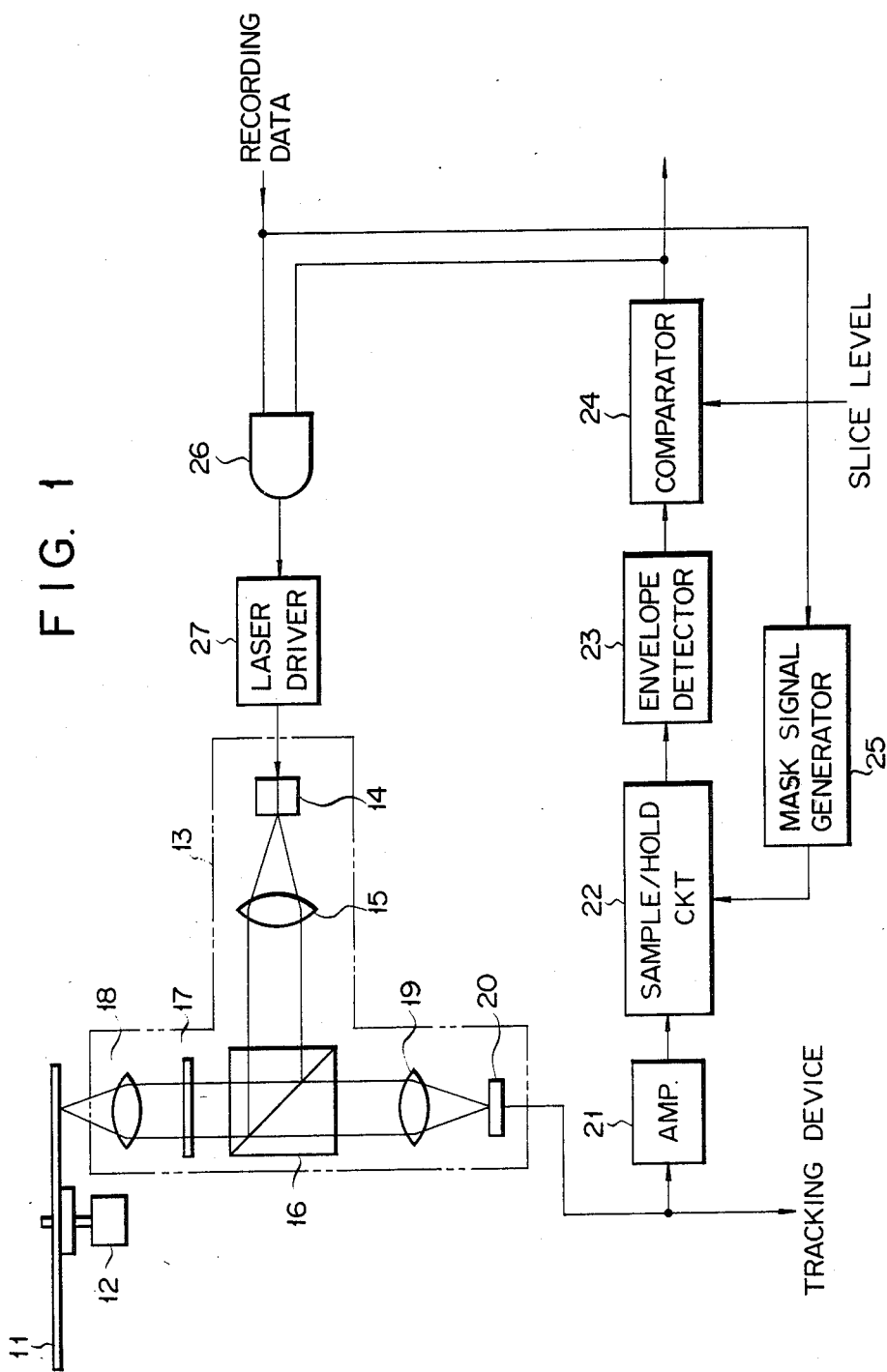
FIG. 1 is a partial block diagram of an optical disc apparatus having an overlay recording prevention device according to an embodiment of the present invention.

As shown in FIG. 1, an optical disc 11 is rotated by a motor 12. The optical disc 11 has a pregroove thereon. An optical head 13 is disposed to oppose the optical disc 11. A semiconductor laser 14 is arranged in the optical head 13. A collimator lens 15 and a beam splitter 16 are sequentially disposed at the output end of the semiconductor laser 14. The collimator lens 15 collimates the laser beam from the semiconductor laser 14. The beam splitter 16 reflects the collimated laser beam in a direction perpendicular to the incident direction. A quarter wavelength plate i.e. λ/4 plate 17 and an objective lens 18 are sequentially disposed along the optical axis of the reflected beam. The objective lens 18 serves to focus the laser beam passing through the λ/4 plate 17 onto the optical disc 11. A focusing lens 19 and a photosensor 20 are sequentially disposed on the optical axis of the laser beam transmitted through the beam splitter 16.

The output end of the photosensor 20 is connected to the input end of a sample-and-hold circuit 22 through an amplifier 21. The output end of the sample-and-hold circuit 22 is connected to the input end of an envelope detector 23. The output end of the envelope detector 23 is connected to one input end of a comparator 24. A slice level signal is supplied to the other input end of the comparator 24. The output end of the comparator 24 is connected to one input end of an AND gate 26. The output end of a recording signal source (not shown) is connected to the input end of a mask signal generator 25 and also to the other input end of the AND gate 26. The output end of the mask signal generator 25 is connected to the control end of the sample-and-hold circuit 22. The output end of the AND gate 26 is connected to the input end of a laser driver 27. The laser driver 27 is connected to the semiconductor laser 14 to drive it.

The mode of operation of the overlay recording prevention device having the arrangement described above will be described hereinafter.

In the recording mode, the optical disc 11 is rotated by the motor 12, and the optical head 13 is moved to a predetermined position of the optical disc 11. In this condition, the laser driver 27 is controlled to drive the laser 14 which then generates a low-level reproducing laser beam. The reproducing laser beam is incident on the objective lens 18 through the collimator lens 15, the beam splitter 16 and the λ/4 plate 17. The laser beam is then focused on the optical disc 11 so as to have a beam spot of about 1 μm in diameter. When the laser beam is reflected by the optical disc 11, the reflected beam is incident on the photosensor 20 through the objective lens 18, the λ/4 plate 17, the beam splitter 16 and the focusing lens 19. The photosensor 20 produces a photoelectric signal corresponding to the reflected light which is incident thereon. When the photoelectric signal is supplied to a tracking device (not shown), the laser beam is so controlled as to trace the pregroove of the optical disc 11 in accordance with known tracking control. In this condition, when recording data a is supplied to the laser driver 27 through the AND gate 26, the laser driver 27 supplies a recording drive pulse b to the laser 14. The laser 14 radiates the high-level recording laser beam in accordance with the recording drive pulse b. When the recording laser beam is focused on the optical disc 11 through the collimator lens 15, the beam splitter 16, the λ/4 plate 17 and the objective lens 18, a pit is formed by the high-energy laser beam in the pregroove of the optical disc 11. Light of strong intensity is reflected and is incident on the photosensor 20 through the objective lens 18, the λ/4 plate 17, the beam splitter 16 and the focusing lens 19. The photosensor 20 then produces a photoelectric signal c of high level. This signal c is amplified by the amplifier 21. The amplified signal is then supplied to the sample-and-hold circuit 22, and the sample-and-hold circuit 22 is kept in the holding status in response to a mask signal d of logic level "1" from the mask signal generator 25. The sample-and-hold circuit 22 then produces the immediately previous signal component of the signal c, i.e., the reproducing level component. Thereafter, when the laser beam level is changed to the reproduction level, the photoelectric signal goes low. When the mask signal d goes to level "0", the sample-and-hold circuit 22 is kept in the sampling status. The sample-and-hold circuit 22 then produces a photoelectric signal component of low level. Therefore, in the normal recording mode, the sample-and-hold circuit 22 produces a signal e having a constant level. The signal e is supplied to the comparator 24 through the envelope detector 23 to be compared with the slice level signal. The comparator 24 then produces a signal f of high level. As a result, the recording data a is continuously supplied to the laser driver 27 through the AND gate 26, so that this data is recorded on the optical disc 11. In the recording mode, while the high-level recording laser beam is not produced, the low-level reproducing laser beam is produced. Therefore, the low-level signal component (having a substantially constant level) of the photoelectric signal c corresponding to the reproducing laser beam is used for tracking control as a tracking signal component.

In the recording mode described above, if a tracking error occurs for any reason and the laser beam impinges on an already-recorded track, a signal component corresponding to the recording data appears in the tracking signal component between the high-level signal components of the photoelectric signal c in a form of a level variation. This data signal component i.e. the level variation component of the tracking signal component passes through the sample-and-hold circuit 22 when the mask signal d is kept at level "0". Therefore, the output e from the sample-and-hold circuit 22 varies in response to the level variation component. When this output e is supplied to the envelope detector 23, the envelope of the output e is detected. An enveloped signal from the envelope detector 23 is supplied to the comparator 24 and is compared with the slice level signal, and the output f from the comparator goes to low level. This low-level signal is supplied to the AND gate 26, so that the recording data a will not be supplied to the laser driver 27. As a result, the laser driver 27 does not supply the recording drive pulse b to the laser 14, which then stops radiation of the high-level recording laser beam.

In this manner, when a tracking error occurs in the recording mode and the beam spot is shifted onto an already-recorded track, the data component which is mixed in the tracking signal to be detected in the recording mode can be detected. The high-level recording laser beam is stopped by a detection signal. A second recording pit may not be formed in the already-recorded track, thus preventing overlay recording.

When the output from the comparator 24 is supplied to, for example, a CPU (not shown) which controls the operation of the optical disc apparatus, the data may not be supplied from the recording signal source, and recorded data can be displayed.

Furthermore, in the above embodiment, the envelope of the output signal from the sample-and-hold circuit is detected by the envelope detector. When the level of this enveloped signal becomes lower than the slice level, an overlay recording prevention signal is produced. However, the overlay recording prevention signal may be produced when the level of the output signal from the sample-and-hold circuit becomes lower than the slice level.

What we claim is:

1. An overlay recording prevention device for an optical disc apparatus having an optical head which has means for selectively radiating an optical disc with a low-level light beam and a high-level recording light beam for forming pits corresponding to recording data on said optical disc and means for converting light reflected from the optical disc into a photoelectric signal, comprising:

means for detecting a signal component corresponding to the low-level light beam from the photoelectric signal obtained by said optical head in a recording mode, said detecting means including: mask signal generating means for generating a mask signal in synchronism with recording data; and a sample-and-hold circuit for sampling and holding the photoelectric signal in synchronism with the mask signal from said mask signal generating means;

level variation detecting means for detecting a variation in level of the signal component due to light reflected from the pits already formed on the optical disc and for outputting a detection signal; and stopping means for stopping generation of the high-level recording beam in response to the detection signal from said level variation detecting means.

2. A device according to claim 1, wherein said stopping means comprises means for interrupting transfer of the recording data in response to the detection signal from said level variation detecting means.

3. A device according to claim 1, wherein the light beam comprises a laser beam.

4. An overlay recording prevention device for an optical disc apparatus having an optical head which has means for selectively radiating an optical disc with a low-level light beam and a high-level recording light beam for forming pits corresponding to recording data on said optical disc and means for converting light reflected from the optical disc into a photoelectric signal, comprising:

means for detecting a signal component corresponding to the low-level light beam from the photoelectric signal obtained by said optical head in a recording mode;

level variation detecting means for detecting a variation in level of the signal component due to light reflected from the pits already formed on the optical disc and for outputting a detection signal, said level variation detecting means including: an envelope detector for enveloping an output signal from said tracking signal component detecting means and for producing an enveloped signal; and comparing means for comparing the enveloped signal from said envelope detector and a signal having a predetermined level and for producing an overlay recording prevention signal; and stopping means for stopping generation of the high-level recording beam in response to the detection signal from said level variation detecting means.

5. A device according to claim 4, wherein said stopping means comprises means for interrupting transfer of the recording data in response to the detection signal from said level variation detecting means.

6. A device according to claim 4, wherein the light beam comprises a laser beam.

* * * * *

UNITED STATES PATENT AND TRADEMARK OFFICE
CERTIFICATE OF CORRECTION

PATENT NO.   : 4,570,251
DATED        : February 11, 1986
INVENTOR(S)  : Tsuneshi YOKOTA, Akira NAKAGAWA It is certified that error appears in the above-identified patent and that said Letters Patent is hereby corrected as shown below:

ON THE FIRST INFORMATION PAGE:

Change "[73] Assignee: Tokyo Seibaura Denki Kabushiki Kaisha" to --[73] Assignee: Tokyo Shibaura Denki Kabushiki Kaisha--.

Signed and Sealed this

Twenty-fourth Day of June 1986

[SEAL]

Attest:

DONALD J. QUIGG

*Attesting Officer*  *Commissioner of Patents and Trademarks*